April 2, 1963     L. B. ENTZMINGER     3,083,819
COMBINED CONTACT LENS CARRIER AND GUARD UNIT
Filed Sept. 20, 1961

LINDELL B. ENTZMINGER
INVENTOR.

BY Vincent Martin
Jod E. Edwards
M. H. Gay
ATTORNEYS

United States Patent Office 3,083,819
Patented Apr. 2, 1963

3,083,819
COMBINED CONTACT LENS CARRIER AND GUARD UNIT
Lindell B. Entzminger, Houston, Tex.
Filed Sept. 20, 1961, Ser. No. 139,534
10 Claims. (Cl. 206—5)

This invention relates to a combined contact lens carrier and guard unit.

In using contact lenses, the wearer normally inserts or removes the lenses over the usual wash basin because it is desirable that the lenses be rinsed with clear water. Such practice results in the loss of many lenses because if a lens is accidentally dropped into the wash basin, its small size permits it to pass down the usual wash basin drain passage. These losses may be readily prevented by providing a screen or perforated guard, having small openings through which the lens cannot pass, over the drain passage but the provision of a separate guard member is inconvenient because it may become misplaced or may not always be within reach at the time it is needed. All contact lenses are stored when not in use in a contact lens carrier and obviously, when the wearer is either applying or removing his lenses, the carrier is always at hand.

It is, therefore, one object of this invention to combine with the usual contact lens carrier a guard member which is constructed to coact with the usual wash basin drain passage in a manner to prevent escape of a contact lens into the drain; the guard member being so combined with the lens carrier as to be a part thereof, whereby it is always conveniently available for use.

Another objetct is to provide a combination contact lens carrier and guard member, wherein the guard member may be made integral with the carrier body or may be suitably threaded or otherwise connected thereto; said guard member being of such size and shape that it will coact with the usual drain passage of a wash basin to permit water flow through the opening while preventing passage of a contact lens into said drain passage.

A further object is to combine a guard member with a contact lens carrier and to construct said guard member to fit over the wash basin drain passage or to fit within said passage, depending upon the type of drain passage and its usual closure; said guard being formed with openings which function as a screen to permit water to freely pass therethrough while preventing passage of the contact lens, whereby possible loss of said lens through the wash basin drain passage is obviated.

The construction designed to carry out the invention will be hereinafter described, together with other features thereof.

The invention will be more readily understood from a reading of the following specification and by reference to the accompanying drawings forming a part thereof, wherein an example of the invention is shown, and wherein.

Figure 1:
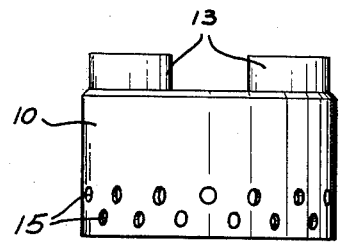
FIGURE 1 is an elevation of a combined contact lens carrier and guard member, constructed in accordance with the invention.

In the drawings the numeral 10 designates a generally cylindrical body which may be constructed of plastic or any other suitable material and which body is formed with two cavities 11 and 12 adapted to receive and store contact lenses which are indicated at A. The upper end of each cavity is open and has its bore internally threaded to receive a closure 13. As is well known, it is desirable to store contact lenses within a fluid which is usually contained in the cavities 11 and 12 and the closures 13 properly seal the respective cavities and retain the contact lenses therein. The body 10 having the cavities and the closures or plugs 13 is similar to contact lens carriers which are now in general use; as noted, this body may be made of plastic or other suitable material.

In carrying out the present invention, the body 10 is formed with a depending annular collar or skirt 14 having a plurality of perforations or openings which are disposed at circumferentially spaced points around the skirt. Each opening is of a relatively small size which is less than the diameter of a contact lens A whereby such contact lens cannot pass therethrough. The inner diameter 14a of the collar 14 is related to the diameter of the usual drain passage or tube 16 of a wash basin, a portion of which is designated by the letter W. In actual practice the diameter of the inner wall 14a of the collar 14 is preferably slightly larger than the diameter 16 of the drain passage so that the collar or skirt 14 may be placed over the drain passage in the manner illustrated in FIGURE 2 to encompass the same. When so placed, it is evident that the annular collar having the perforations 15 therein forms a guard member which will prevent a contact lens from passing downwardly into the drain passage 16. By reason of the perforations 15, it is possible that water may be flowing into the wash basin, through the perforations and escaping through the drain passage 16, without any danger of the contact lens A washing down the drain passage.

Figure 2:
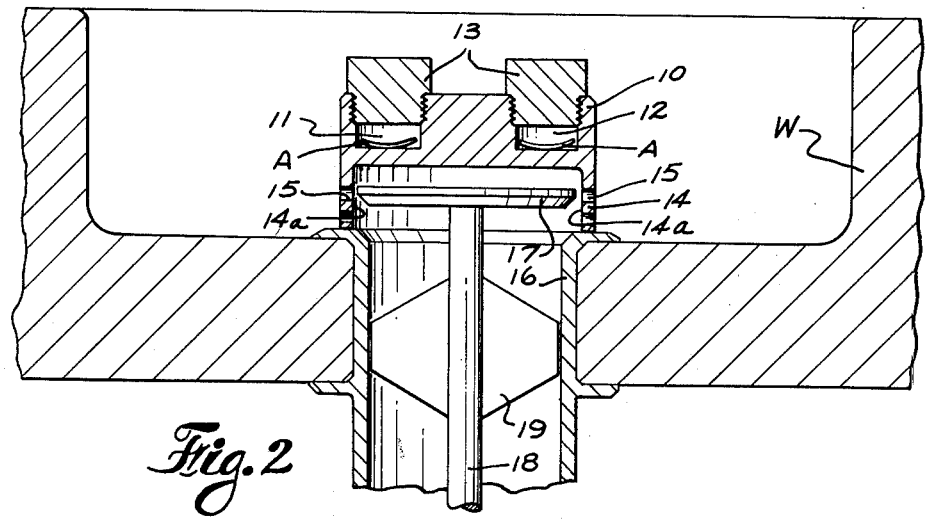
FIGURE 2 is a partial view of a wash basin showing the manner in which the guard member of the device of FIGURE 1 fits over the usual wash basin drain passage to prevent loss of a contact lens through said passage.

In FIGURE 2, the wash basin illustrated includes the usual metallic closure disk or plug 17 which is mounted at the upper end of an operating stem or rod 18. In accordance with usual practice, the stem or rod has guide wings 19 which maintain axial alignment of the rod and closure disk 17. When the disk 17 is in lowered position, it moves into the passage 16 to close the same; however, when the disk is raised as shown in FIGURE 2, water within the basin W may pass downwardly through the drain passage 16.

Since the outer diameter of the usual closure disk or plug 17 is of slightly larger diameter than the drain passage 16, it is evident that with the closure disk in its raised or open position as shown in FIGURE 2, said closure disk is located within the encircling collar 14. Therefore, with the guard collar 14 placed around and above the drain opening, the usual closure disk 17 will function as an aligning or guide element to maintain substantial axial alignment of the guard collar 14 with the drain passage 16; in other words, lateral shifting of the guard collar will be limited by the inner surface of said collar engaging the outer periphery of the usual closure disk 17.

The function of the combined lens carrier and guard member unit is evident from the foregoing. The guard member in the form of the annular perforated collar 14 is of a size to encircle the usual drain opening closure 17 and to be placed in position over the drain opening. The guard member, being integral with the body 10 of the lens carrier, is a part of such carrier and is available at all times that the user of the contact lenses A is either inserting or removing the lenses from the eyes. In use, it is only necessary to properly position the guard member, as shown in FIGURE 2, and the user may gain access to the cavities or chambers which hold the lenses A by removing the plugs 13. The guard member effectively closes the drain passage 16 in a manner which will effectively prevent the contact lens from being washed down the drain. If desired, the water which is usually employed in rinsing the lenses can be flowing into the wash basin and will escape through the perforations 15 in the guard member collar 14 and pass out through the drain passage 16. If the user should accidentally drop one of the lenses, the lens will not pass through the perforations 15, and thus loss of the lens is prevented. By making the guard member an integral part of the body 10 which carries the contact lenses, the guard member is at all times available when it is needed.

There are in use many types of wash basins having closures in the form of stoppers or the like and in this sense are different from the type of closure shown in FIGURE 2. In such instance, the drain passage 16a of such a wash basin W, shown in FIGURE 4, would be completely open when the closure or stopper is removed. In order to provide a guard member for use with this type of drain passage 16a, the combined lens carrier and guard member is modified as shown in FIGURES 3.

Figure 3:
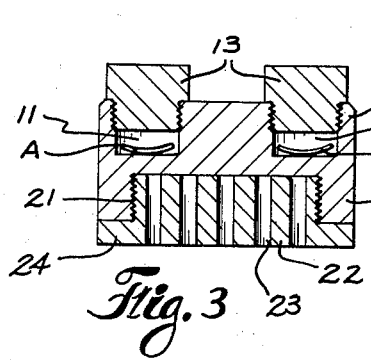
FIGURE 3 is a transverse vertical sectional view of a modified form of combined contact lens carrier and guard member.

Referring to FIGURE 3, the body 10 is formed with the same cavities or recesses 11 and 12 for receiving the contact lenses A and such cavities are closed by the closures 13. The lower portion of the body 10 in this instance is formed with a depending annular flange 20 which is internally threaded as indicated at 21. The guard member 22 in this form of the invention is a circular disk having a plurality of perforations 23 extending therethrough. The disk is threaded to engage with the threads 21 and has an external annular flange 24. The guard member 22 is thus threaded into the bottom of the lens carrier and forms a part of the overall unit. Just as in the first form, the guard member, being a part of the lens carrier is readily available when needed.

Figure 4:
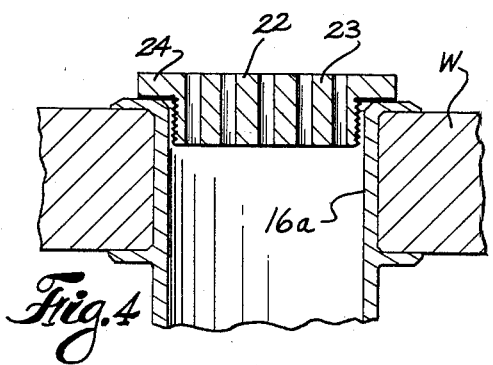
FIGURE 4 illustrates the guard member of the device of FIGURE 3 positioned within the drain passage of a wash basin.

In using the guard member 22 of the form shown in FIGURE 3, the member is unthreaded from the flange 20 and is inverted so as to be placed in position over the wash basin drain passage 16a in the manner shown in FIGURE 4. The external flange 24 of the guard disk 22 overlies the peripheral portion surrounding the drain passage and the outer diameter of the threaded portion of the disk 22 is such that it will clear the inner wall of the drain passage. The disk 22 thus effectively closes the drain passage 16a of the wash basin W so that a flow of water may occur outwardly through the passage 16a and yet the contact lens A cannot pass downwardly therethrough because it cannot pass through the perforations 23 of the disk 22. Of course, after the user has either inserted or removed the contact lenses from the eyes, the disk 22 is again threaded into the lower end of the unit to become a part thereof so as to be available when needed upon the next use.

Figure 5:
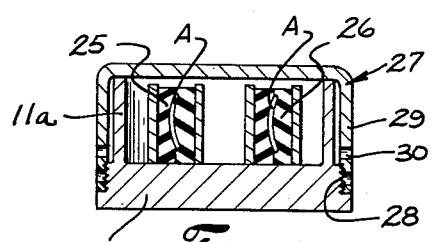
FIGURE 5 is a transverse vertical sectional view of another type of contact lens carrier having a guard member combined therewith.

In FIGURE 5 still another modification of the invention is shown and in this form a different type of contact lens carrier is illustrated. In this instance, the lens carrier comprises a body which is in the general form of a circular base 10a having an upstanding annular flange or wall 11a. A pair of opposed sponge or absorbent pads 25 are provided for one contact lens A while a similar pair of pads 26 are provided for the second contact lens A. The lens is merely slipped into place between the absorbent pads which are saturated with the desired liquid and are maintained in position by frictional contact. A cover 27 is adapted to enclose the contact lenses and this cover is threaded at 28 onto threads provided on the outer periphery of the disk body 10a; when in place, the underside of the cover seals with the upper surface of the annular wall 11a whereby suitable liquid may be retained in the area surrounding the pads. The cover includes an annular side wall 29 having perforations or openings 30 therein. The inner diameter of the wall 29 is related to the size or diameter of the wash basin drain passage 16 and thus the cover 27 may function as a guard member.

In using the form of FIGURE 5, the cover 27 is unscrewed from the lens carrier and is placed in position over the drain opening 16 in substantially the same manner that the guard collar 14 is placed over the opening as shown in FIGURE 2. When in position, the cover 27 prevents either of the lenses A from being washed down the drain opening 16 and after use, the cover 27 is rethreaded into position on the body 10a.

In all forms of the invention the guard member is constructed as a part of the lens carrier and, therefore, it is available at all times when the contact lenses are being inserted or removed from the eyes by the wearer. In the form shown in FIGURE 1, the guard member is made as an integral part of the lens carrier. In the forms of FIGURES 3 and 5, the guard member is a part of the overall unit but is threadedly connected in position so that it may be removed when it is to be used to close the drain passage of the wash basin. In each instance, the guard member is perforated so that a flow of water downwardly through the drain passage of the wash basin may occur while the guard member is in place; however, since the perforations in the guard member are of sufficiently small size to prevent passage of a contact lens, there is no danger of said lens being accidentally or inadvertently washed down the drain passage. The inner diameter of the guard members shown in FIGURES 1 and 5 are related to the diameter of the drain passage so as to encircle said drain passage, whereas the external diameter of the plug type guard member of FIGURE 3 is related to the passage so that its outer periphery may enter said passage; in this latter form the plug type guard member is supported in position by a flange which overlies the peripheral portion surrounding the drain passage 16a. In all cases, the guard member, being a part of the lens carrier, is readily available at any time that the lenses are to be inserted or removed from the eyes of the wearer.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. A contact lens carrier and guard unit including, a body having means for receiving and retaining a pair of contact lenses, an annular guard collar integral with and extending downwardly from said body and having a plurality of perforations therein, which perforations are of a size to prevent a contact lens from passing therethrough, said annular collar having a diameter related to the diameter of the drain passage of a wash basin so that when said collar is located over said drain passage, a contact lens cannot enter said passage.

2. A contact lens carrier and guard unit including, a body having a pair of cavities for receiving contact lenses, a removable closure for each of said cavities, an annular guard collar integral with and extending downwardly from said body, said guard collar having perforations in its side wall which are of a size smaller than a contact lens, whereby when said guard collar is placed over the drain passage of a wash basin, water may flow through the perforations of the collar while passage of a contact lens is prevented.

3. A contact lens carrier and guard unit including, a body having a pair of cavities for receiving contact lenses, a removable closure for each of said cavities, an annular flange integral with and depending from said body, and a plug-like disk removably secured within said flange and having a plurality of perforations therein, said disk having a diameter which is related to the diameter of the drain passage of a wash basin to permit insertion of the disk into the upper portion of said passage, the perforations in the disk being of a small size which prevents passage of a contact lens therethrough.

4. A contact lens carrier and guard unit including, a generally circular body, retaining means mounted on the upper surface of the body for receiving and retaining a pair of contact lenses, a cover element adapted to encircle and enclose the contact lenses, means for removably securing the cover to the body, said cover element having perforations therein of a size smaller than a contact lens and also having a diameter which is slightly larger than the diameter of the drain passage of a wash basin, whereby when said cover element is placed over said passage, it permits water to flow through said drain passage but prevents entry of a contact lens into the passage.

5. The combination with the usual wash basin drain passage, of a contact lens carrier and guard unit, wherein said unit includes a perforate guard member having a diameter so related to the diameter of the drain passage that when the guard member is positioned adjacent the upper end of the passage, said passage is closed except for the perforations in said member, said perforations of said member being smaller than a contact lens to prevent passage of the lens therethrough.

6. The combination set forth in claim 5, wherein the guard member comprises an annular collar having the perforations in its side wall.

7. The combination set forth in claim 5, wherein the guard member comprises a plug-like disk having the perforations extending therethrough in planes which are parallel to the axis of said disk.

8. A contact lens carrier and guard unit including a body having means for receiving and retaining a pair of contact lenses, and a perforate guard member forming part of said body and of a size to coact with the drain passage of a wash basin to close said passage sufficiently to prevent a contact lens entering the passage, said perforate guard member being threadedly connected to said body, whereby it normally forms a part thereof but may be separated therefrom.

9. A contact lens carrier and guard unit including, a body having means for receiving and retaining a pair of contact lenses, and a perforate guard member forming part of said body, the perforations in said guard member being smaller than each contact lens, said perforate guard member being of a size sufficient to overlie the upper end of the usual drain passage of a wash basin to close said passage except for the perforations in said guard member to allow liquid flow into the passage while preventing a contact lens entering said passage from the wash basin.

10. A contact lens carrier and guard unit as set forth in claim 9, wherein the perforate guard member is made integral with said body.

References Cited in the file of this patent
UNITED STATES PATENTS
2,967,607   Hollinger _____ Jan. 10, 1961